(12) United States Patent
Conway

(10) Patent No.: US 12,741,583 B2
(45) Date of Patent: Sep. 22, 2026

(54) HEADLAMP AIMING SYSTEM

(71) Applicant: PACCAR Inc, Bellevue, WA (US)

(72) Inventor: Scott M. Conway, Flower Mound, TX (US)

(73) Assignee: PACCAR, Inc., Bellevue, WA (US)

( * ) Notice: Subject to any disclaimer, the term of this patent is extended or adjusted under 35 U.S.C. 154(b) by 0 days.

(21) Appl. No.: 18/613,009

(22) Filed: Mar. 21, 2024

(65) Prior Publication Data

US 2025/0296498 A1 Sep. 25, 2025

(51) Int. Cl.

*B60Q 1/068* (2006.01)
*B60Q 1/14* (2006.01)
*F21S 41/141* (2018.01)
*F21S 41/19* (2018.01)

(52) U.S. Cl.

CPC ............... *B60Q 1/068* (2013.01); *B60Q 1/14* (2013.01); *F21S 41/141* (2018.01); *F21S 41/192* (2018.01); *B60Q 2200/32* (2013.01)

(58) Field of Classification Search

CPC .................................................. B60Q 2200/32
See application file for complete search history.

(56) References Cited

U.S. PATENT DOCUMENTS 5,360,282 A * 11/1994 Nagengast ........... B60Q 1/0683 403/119
2003/0117810 A1* 6/2003 Nakazawa ........... B60Q 1/0683 362/273
2008/0225543 A1* 9/2008 Kuwahara ............. B60Q 1/076 362/523
2022/0097598 A1* 3/2022 Chen ...................... B60Q 1/115

FOREIGN PATENT DOCUMENTS

KR 101929737 B1 * 3/2019 ............. B60Q 1/068
WO WO-2011096372 A1 * 8/2011 .......... F16C 11/0685

OTHER PUBLICATIONS

Machine translation of WO 2011096372 A1 retrieved from the FIT database of PE2E search. (Year: 2025).*
Machine translation of KR 101929737 B1 retrieved from the FIT database of PE2E search. (Year: 2026).*
Website: "Aiming Adjusters", ASYST Technologies, Sep. 21, 2023, 5 pages, https://web.archive.org/web/20230921212731/https://asysttech.com/modular_motion_transfer.
Website: "Ball Sockets", ASYST Technologies, Sep. 21, 2023, 4 pages, https://web.archive.org/web/20230921212731/https://asysttech.com/modular_motion_transfer.

* cited by examiner

*Primary Examiner* — Colin J Cattanach
(74) *Attorney, Agent, or Firm* — Womble Bond Dickinson (US) LLP

(57) ABSTRACT

A headlamp aiming system includes: a carrier frame having opposite fore and aft sides, having a ball joint opening extending between the fore and aft sides, and being configured to attach to at least one headlamp projector unit; a ball joint including a ball at a fore end of the ball joint, the ball joint extending through the ball joint opening such that the ball is at least partially on the fore side of the carrier frame; a cap attached to the fore side of the carrier frame and covering the ball joint opening; and a receptacle shell directly covering the ball, the receptable shell being between the ball and the cap and between the ball and the carrier frame.

13 Claims, 13 Drawing Sheets

HEADLAMP AIMING SYSTEM

DESCRIPTION OF THE RELATED ART

A vehicle may include headlamps for generating light to illuminate an area ahead of the vehicle, and the vehicle may have a headlamp aiming system configured to controllably aim (e.g., vertically aim) the generated light. The headlamps may use different types of light sources for generating the light, and the light sources may be attached to other components within the headlamp aiming system. The type of light source can affect how heavy the light source is. For example, an LED light source can be significantly heavier than other types of light sources. However, a heavier light source can increase the risk that components within the headlamp aiming system will disengage or disconnect from each other due to higher forces imposed between the components during normal operation of the vehicle. For example, a vehicle can move abruptly around while driving on an uneven road, such as a bumpy dirt road, or over a pothole, and the abrupt movement can result in minor movement (e.g., vibration) between components of the headlamp aiming system. If the force of such movement is sufficiently high, the components can disengage or disconnect, thereby requiring repair of the headlamp aiming system and possibly causing a safety hazard to the vehicle's driver.

The present disclosure is provided in view of this technical background. This background section is provided only for purposes of introducing certain background material relating to the present disclosure and, thus, is not an admission of prior art.

SUMMARY

This Summary section introduces some features of non-limiting and non-exhaustive examples of the present disclosure, and is not intended to limit the scope of the claims.

According to an aspect, the technology relates to a headlamp aiming system, including: a carrier frame having opposite fore and aft sides, having a ball joint opening extending between the fore and aft sides, and being configured to attach to at least one headlamp projector unit; a ball joint including a ball at a fore end of the ball joint, the ball joint extending through the ball joint opening such that the ball is at least partially on the fore side of the carrier frame; a cap attached to the fore side of the carrier frame and covering the ball joint opening; and a receptacle shell directly covering the ball, the receptable shell being between the ball and the cap and between the ball and the carrier frame.

In some examples, a thickness of the carrier frame between the fore and aft sides of the carrier frame proximate the ball joint opening is defined along a thickness direction, and a greatest width of the ball along a width direction perpendicular to the thickness direction is less than a smallest width of the ball joint opening along the width direction, and a greatest width of the combination of the ball and the receptacle shell along the width direction is greater than the smallest width of the ball joint opening along the width direction.

In some examples, the cap is attached to the carrier frame by one or more screws extending into the fore side of the carrier frame.

In some examples, the receptacle shell and the cap are distinct components, and the receptacle shell has a main body and post protruding from the main body, the post being engaged with an opening in the cap to secure a position of the receptacle shell relative to the cap.

In some examples, the headlamp aiming system includes a bridge controllably movable along a fore-aft direction, the ball joint being attached to the bridge.

In some examples, the headlamp aiming system includes: a headlamp casing, the carrier frame being inside the headlamp housing; a plurality of ball joint sockets attached to the aft side of the carrier frame, the plurality of ball joint sockets being aligned along a rotational axis positioned at one of a top or a bottom of the carrier frame; and a plurality of ball joints attached to the headlamp casing, each of the plurality of ball joints having a ball pivotably engaged with a corresponding one of the ball joint sockets such that the carrier frame can rotate about the rotational axis, wherein the ball joint opening is positioned at the other one of the top or the bottom of the carrier frame.

In some examples, the carrier frame is configured to attach to a first projector unit including a first light source for a high beam of a vehicle and to a second projector unit including a second light source for a low beam of the vehicle.

In some examples, the headlamp aiming system includes the headlamp projector unit, the headlamp projector unit being a light emitting diode (LED) projector unit including an LED light source.

According to an aspect, the technology relates to a headlamp aiming system, including: a carrier frame having opposite first and second sides, having a ball joint opening extending between the first and second sides of the carrier frame, and being configured to attach to at least one headlamp projector unit; a bridge on the first side of the carrier frame, and controllably movable along a translational axis; a ball joint attached to the bridge, having a ball at a terminal end of the ball joint, and extending through the ball joint opening such that the ball is at least partially on the second side of the carrier frame; and a receptacle shell covering the ball, wherein a thickness of the carrier frame between the first and second sides of the carrier frame proximate the ball joint opening is defined along a thickness direction, and wherein a greatest width of the ball along a width direction perpendicular to the thickness direction is less than a smallest width of the ball joint opening along the width direction, and a greatest width of the combination of the ball and the receptacle shell along the width direction is greater than the smallest width of the ball joint opening along the width direction.

In some examples, the receptacle shell is fixedly coupled to the second side of the carrier frame.

In some examples, the receptacle shell is at least partially between the ball and sidewalls of the ball joint opening.

In some examples, the headlamp aiming system includes a cap attached to the second side of the carrier frame and at least partially covering the receptacle shell.

In some examples, the receptacle shell and the cap are distinct components, and the receptacle shell is attached to the cap.

In some examples, the cap is attached to the carrier frame by one or more fasteners extending into the first side of the carrier frame.

In some examples, the carrier frame is configured to rotate about a rotational axis in response the bridge being moved along the translational axis.

According to an aspect, the technology relates to a headlamp aiming system, including: a headlamp casing; a carrier frame at least partially within the headlamp casing, rotatable relative to the headlamp casing about a rotational axis, and being configured to attach to at least one headlamp projector unit; and a bridge at least partially within the headlamp casing, controllably moveable relative to the headlamp casing along a translational axis, and attached to the carrier frame by an attachment assembly, wherein the attachment assembly includes a socket attached to the carrier frame and a ball joint attached to the bridge, the ball joint having a ball pivotably engaged with the socket, and wherein the attachment assembly is configured such that: the ball joint can be dislodged from the socket by a separation force exceeding a first threshold force when the socket is disengaged from the carrier frame; and the ball joint can be dislodged from the socket by a separation force exceeding a second threshold force exceeding the first threshold force when the socket is attached to the carrier frame.

In some examples, the attachment assembly is configured such that the first separation force is less than 400 Newtons and the second threshold force is greater than 400 Newtons.

In some examples, the attachment assembly is configured such that the second threshold force is greater than 800 Newtons.

In some examples, the carrier frame has opposite first and second sides, the bridge is on the first side of the carrier frame, and the socket is attached to the second side of the carrier frame.

In some examples, the attachment assembly includes a cap attached to the socket and to the second side of the carrier frame, the socket being attached to the second side of the carrier frame indirectly by the cap.

BRIEF DESCRIPTION OF THE DRAWINGS

The drawings, together with the specification, illustrate nonlimiting and non-exhaustive examples of the present disclosure.

DETAILED DESCRIPTION

Figure 1:
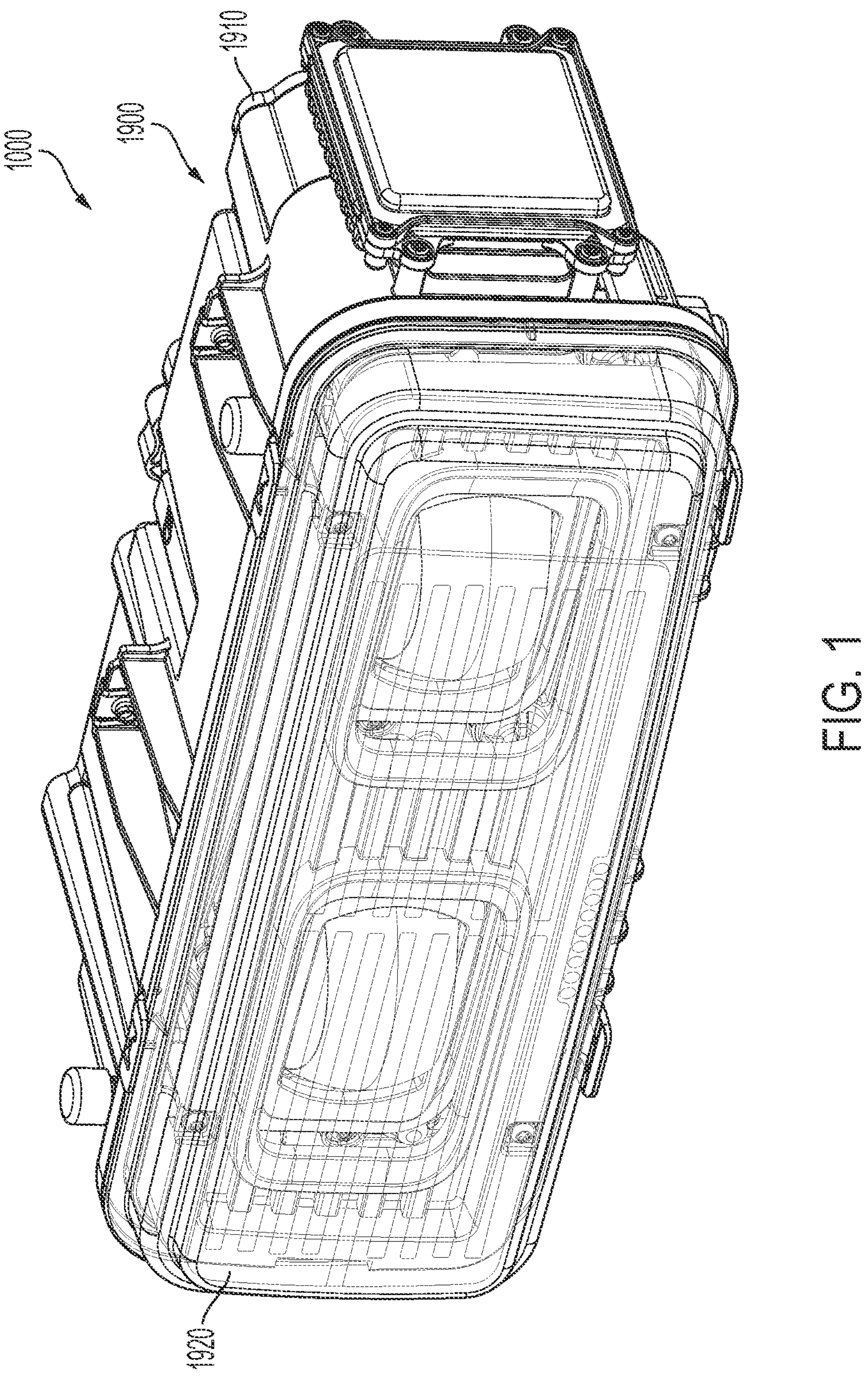
FIG. 1 is a front perspective view of a headlamp aiming system according to some examples.

Headlamp aiming systems will now be described in more detail with reference to the accompanying drawings. The headlamp aiming systems described herein may be configured such that the risk of disengagement between some components is reduced.

It will be understood that, although the terms "first", "second", "third", etc., may be used herein to describe various elements and features, these elements and features should not be limited by these terms. These terms are only used to distinguish one element or feature from another element or feature. Thus, a first element or feature discussed herein could be termed a second element or feature without departing from the spirit and scope of the present disclosure.

Spatially relative terms, such as "top", "bottom", "aft", "fore", and the like, may be used herein for ease of description to describe one element or feature's relationship to another element or feature as illustrated in the figures. It will be understood that the spatially relative terms are intended to encompass different orientations of the device in use or in operation, in addition to the orientation depicted in the figures. For example, if the device in the figures is turned over, elements described as being on top of other elements would then be on the bottom of those other elements. Thus, the term "top" can encompass orientations of above, below, and other orientations.

The terminology used herein is for the purpose of describing particular examples only and is not intended to be limiting of the present disclosure. As used herein, the singular forms "a", "an" and "the" are intended to include the plural forms as well, unless the context clearly indicates otherwise. It will be further understood that the terms "comprises", "comprising", "includes", and "including", when used in this specification, specify the presence of stated elements or features, but do not preclude the presence or addition of one or more other elements or features. As used herein, the term "and/or" includes any and all combinations of one or more of the associated listed items. Further, the use of "may" when describing examples of the present disclosure refers to "one or more examples of the present disclosure."

It will be understood that when an element or feature is referred to as being "on", "connected to", "coupled to", "attached to", or "adjacent to" another element or feature, it can be directly on, connected to, coupled to, attached to, or adjacent to the other element or feature, or one or more intervening elements or features may be present. In contrast, when an element or layer is referred to as being "directly on," "directly connected to", "directly coupled to", "directly attached to", or "immediately adjacent to" another element or feature, there are no intervening elements or features present. Similar terms and phrases should be understood in a similar manner to encompass both direct and indirect affiliations between two or more elements or features being discussed. In addition, it will also be understood that when an element is referred to as being "between" two other elements, it can be the only element between the two other elements, or one or more intervening elements may also be present. Reference to "at least part" of an element, and similar phrases, may include both examples of only part of the element and examples of the entire element.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Figure 2:
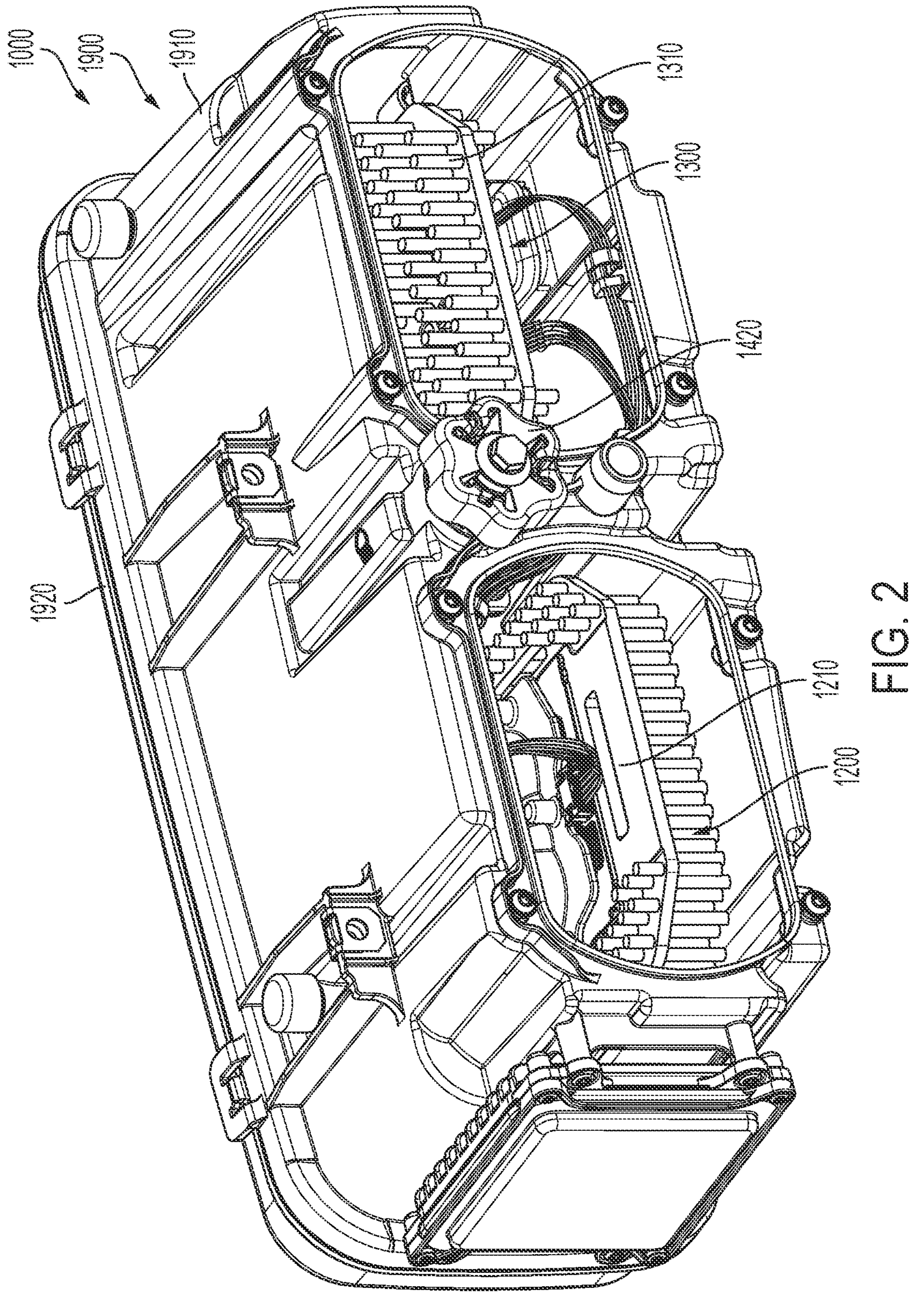
FIG. 2 is a rear perspective view of the headlamp aiming system of FIG. 1 without left and right back panels of a headlamp casing of the headlamp aiming system.
Figure 3:
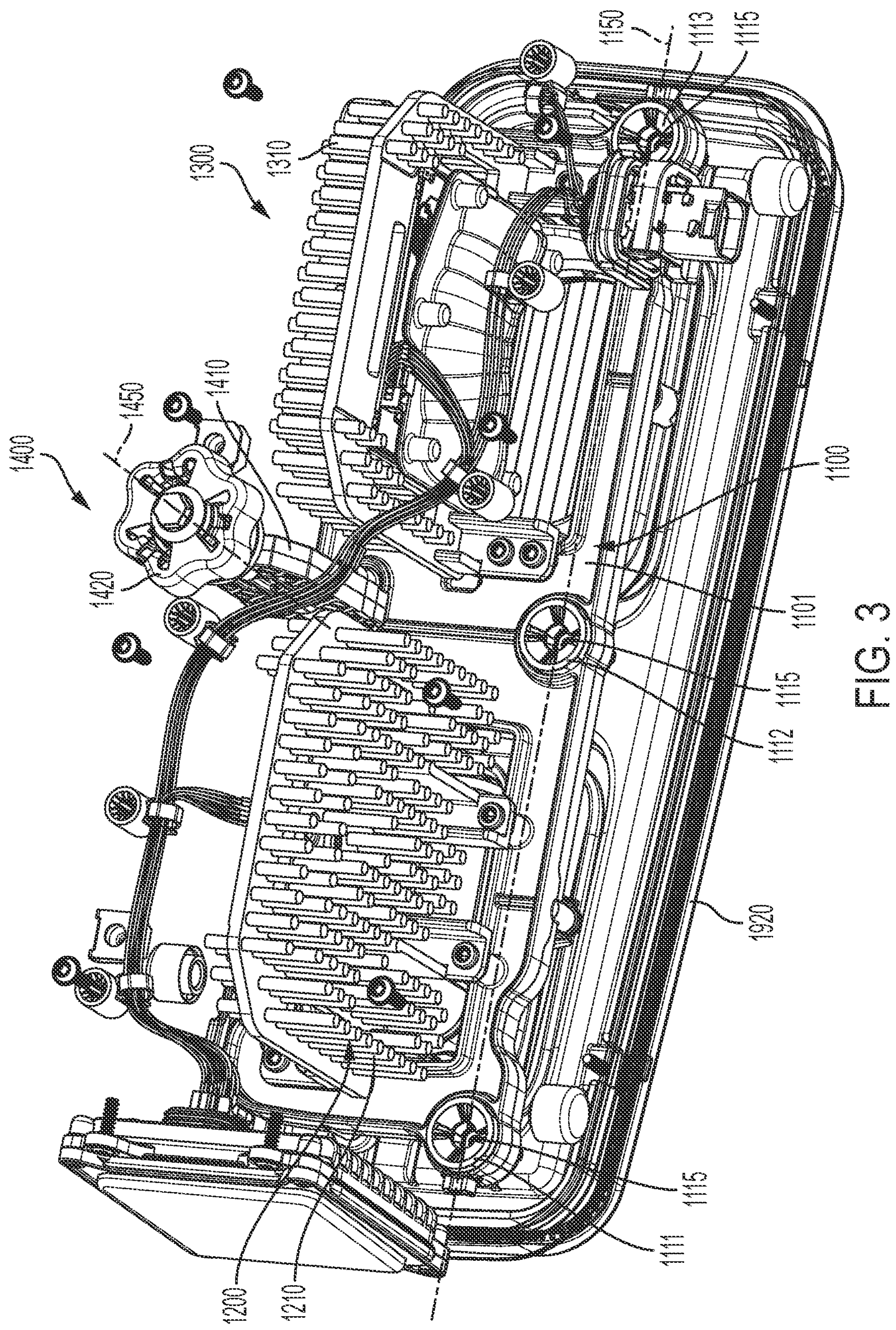
FIG. 3 is a rear perspective view of the headlamp aiming system of FIG. 1 without the headlamp casing.
Figure 4:
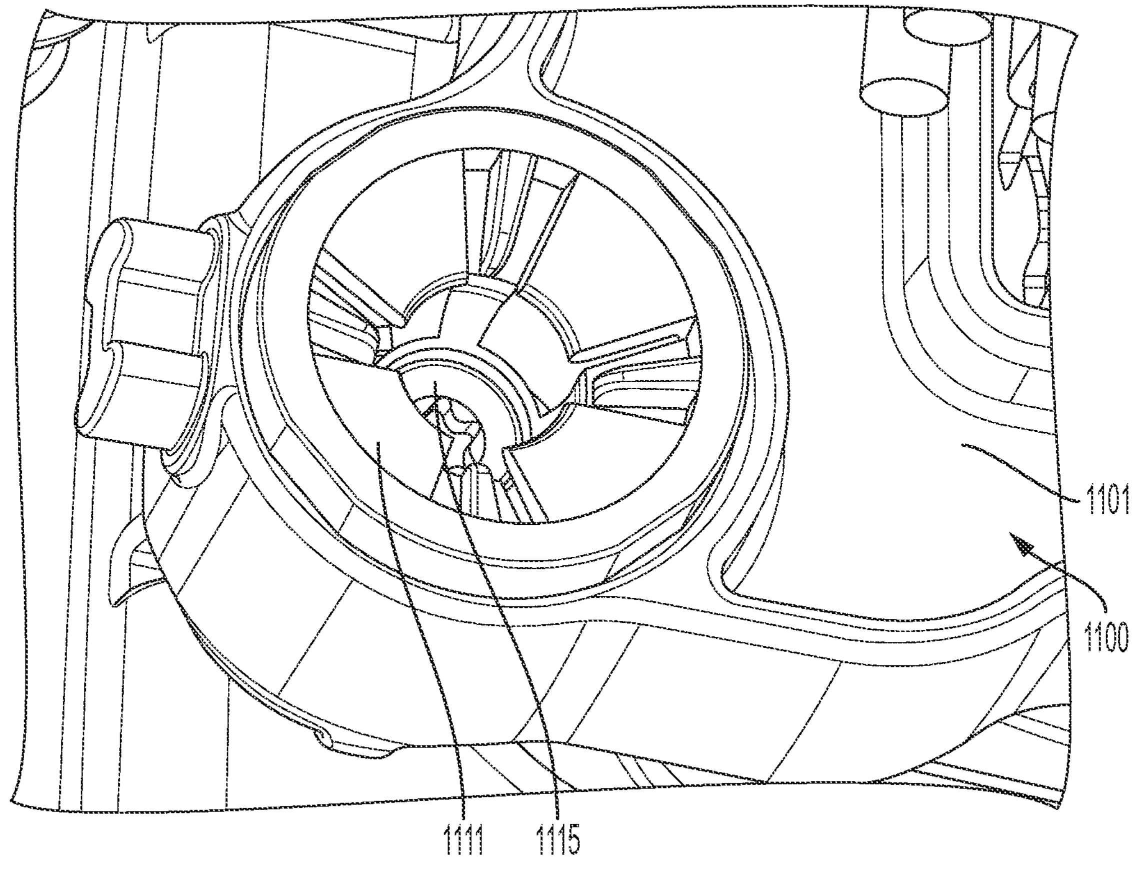
FIG. 4 is a perspective view of a first ball joint socket of the headlamp aiming system of FIG. 1.
Figure 5:
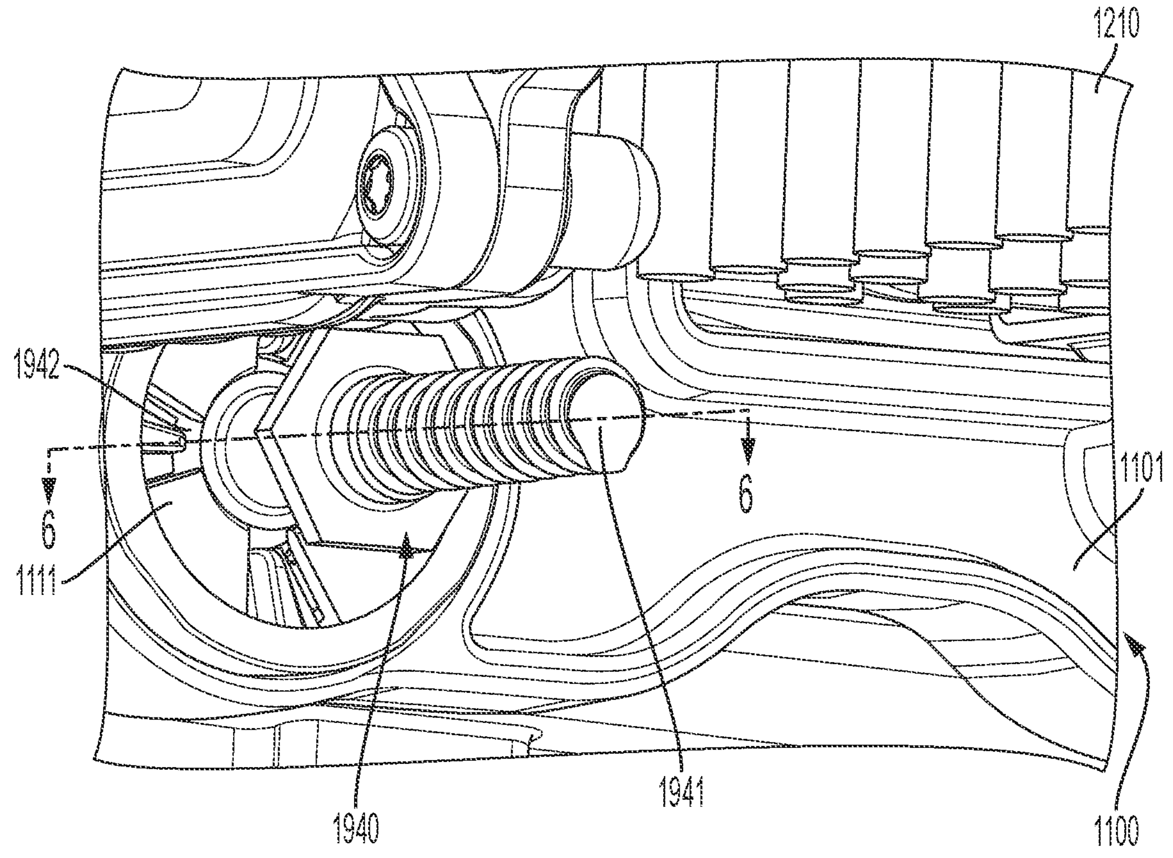
FIG. 5 is another perspective view of the first ball joint socket of the headlamp aiming system of FIG. 1 with a first ball joint installed in the first ball joint socket.
Figure 6:
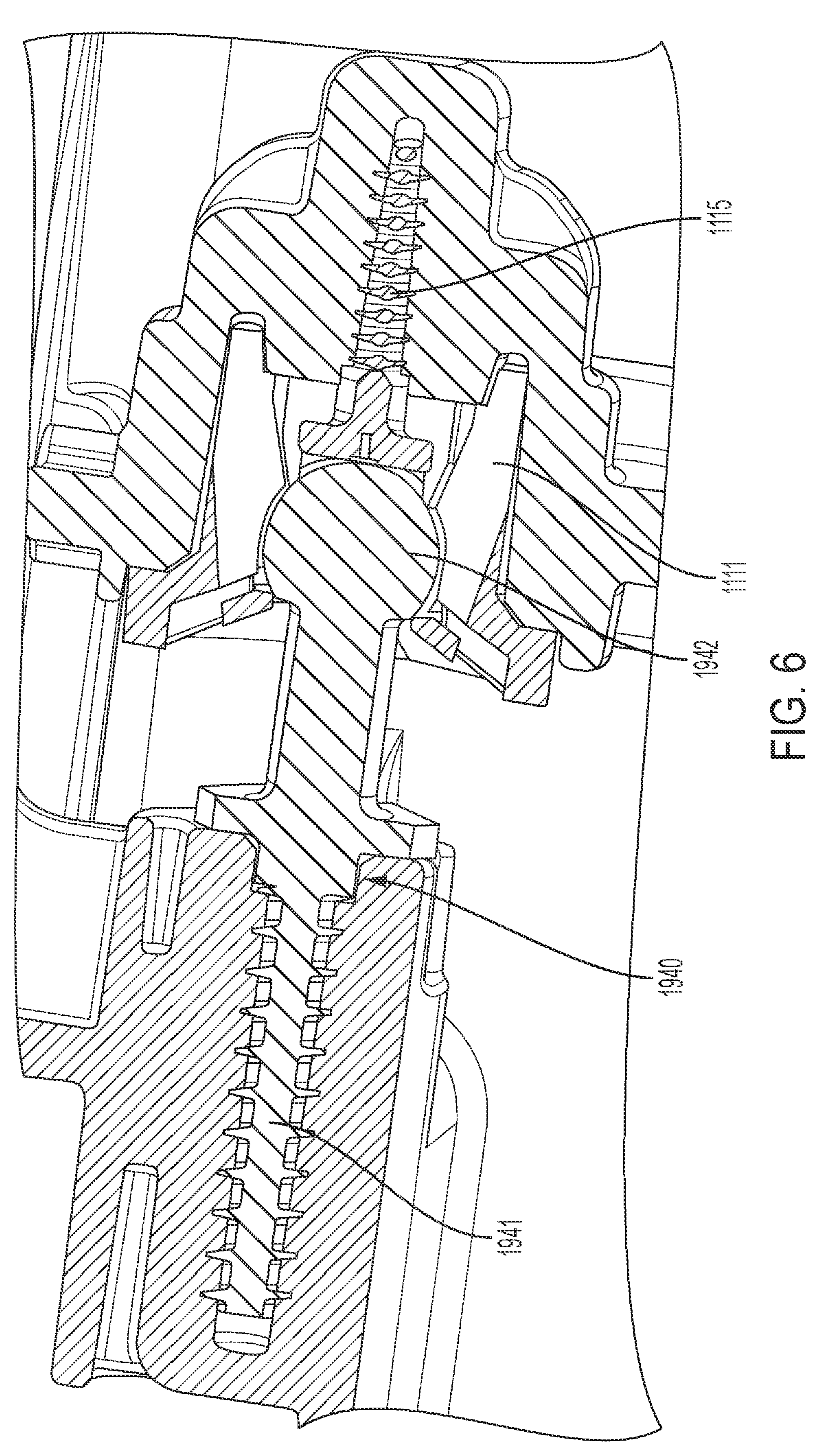
FIG. 6 is a cross-sectional view of the first ball joint socket and the first ball joint of FIG. 5 along the line 6-6 of FIG. 5.
Figure 7:
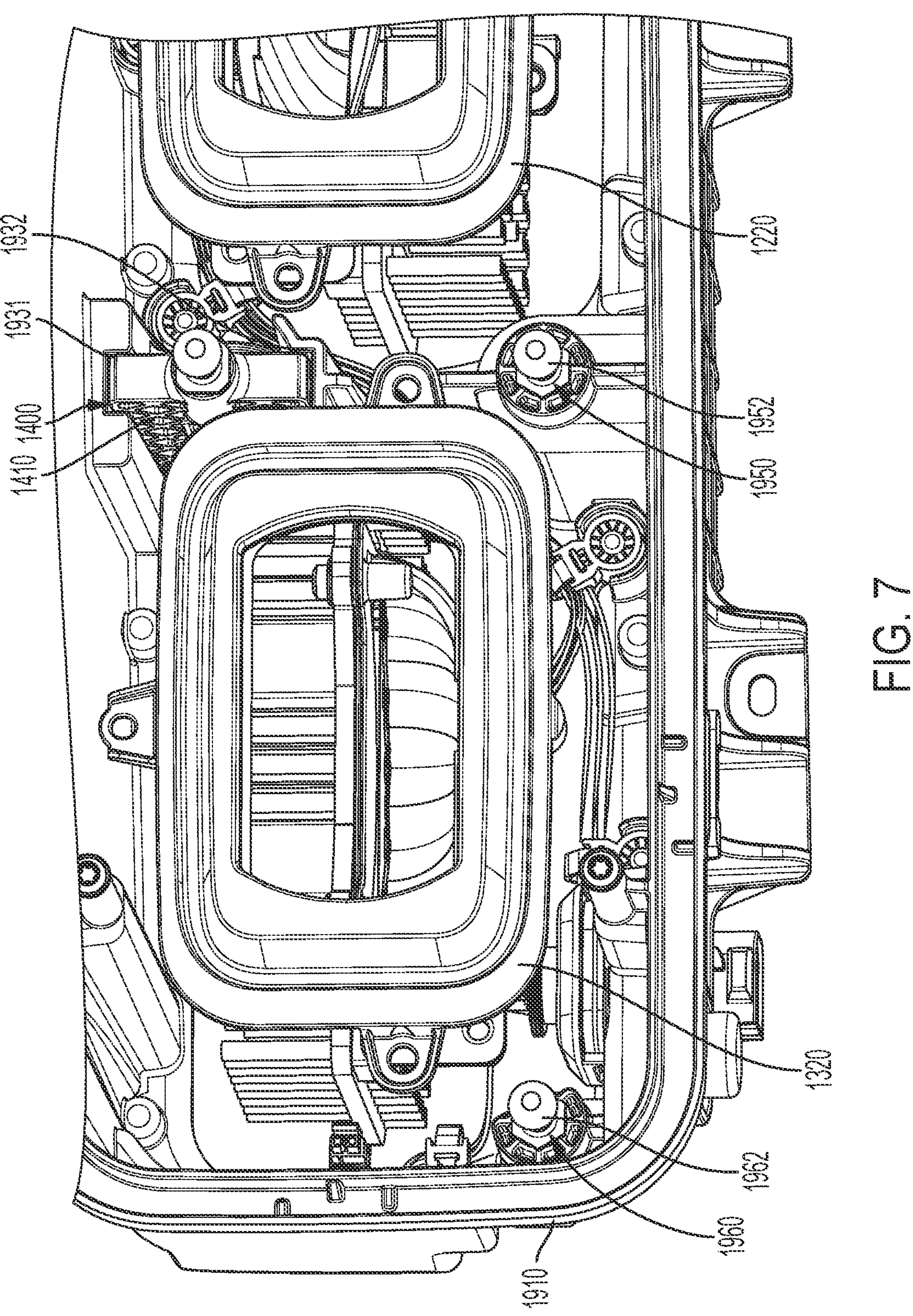
FIG. 7 is a front view of part of the headlamp aiming system of FIG. 1 without a cover lens and a carrier frame of the headlamp aiming system.
Figure 8:
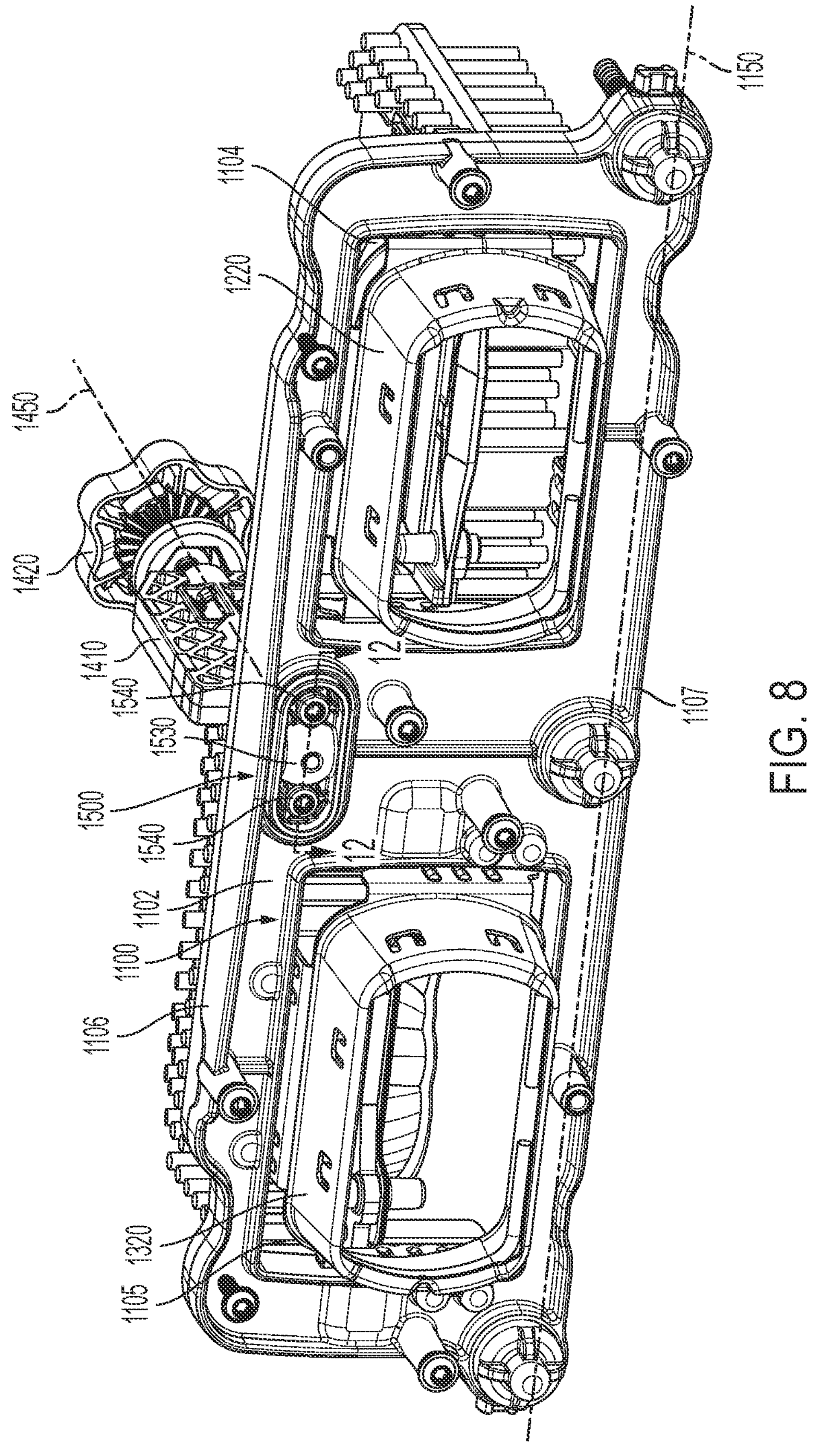
FIG. 8 is a front perspective view of headlamp aiming system of FIG. 1 without the cover lens and headlamp casing of the headlamp aiming system.
Figure 9:
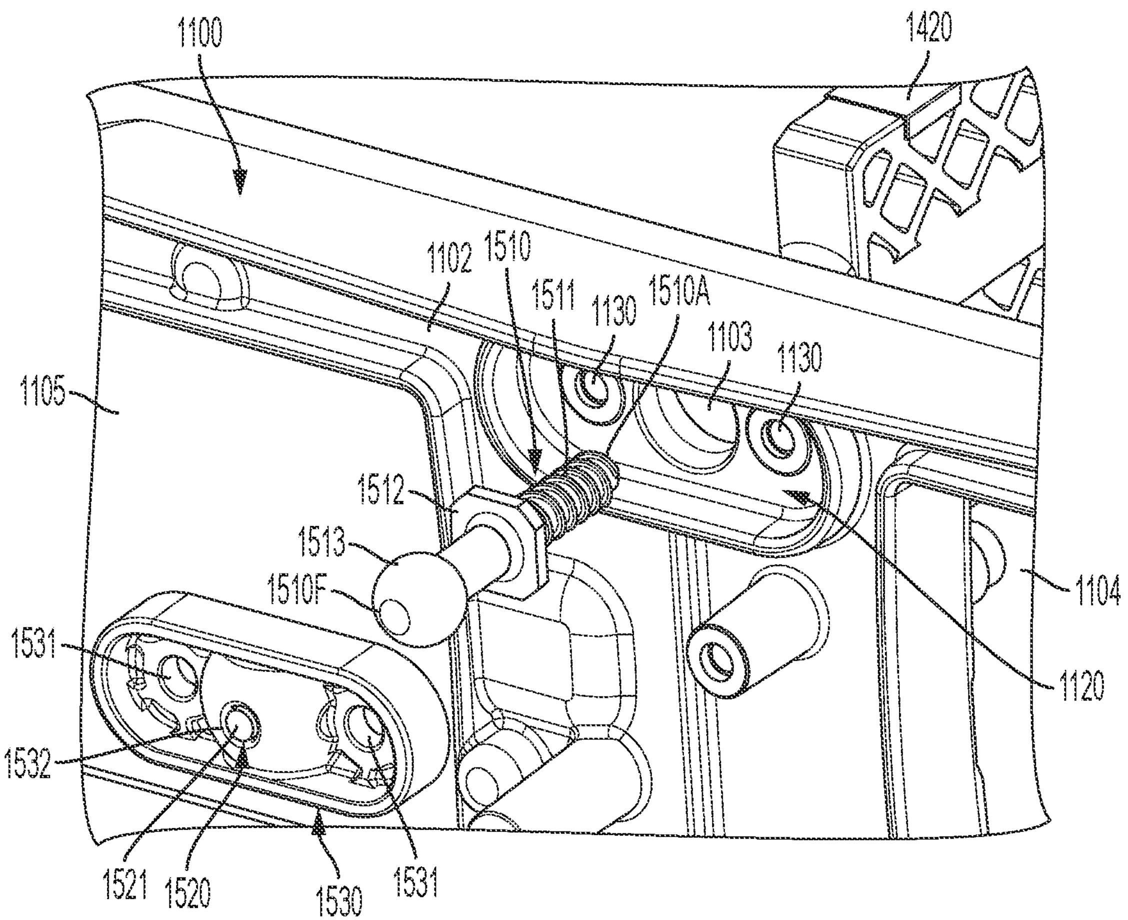
FIG. 9 is a partially exploded perspective front view of an attachment assembly, the carrier frame, and a bridge of the headlamp aiming system of FIG. 1.
Figure 10:
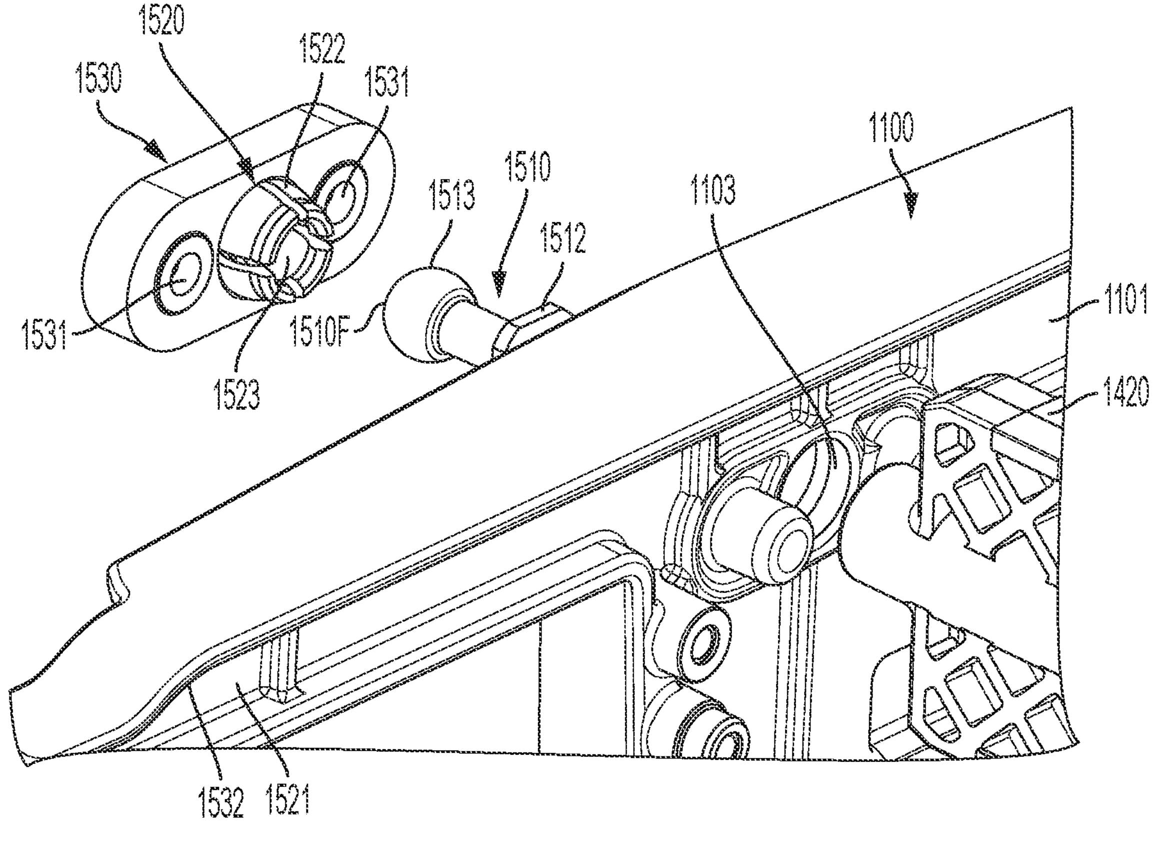
FIG. 10 is a partially exploded perspective rear view of the of the attachment assembly, the carrier frame, and the bridge of the headlamp aiming system of FIG. 1.
Figure 11:
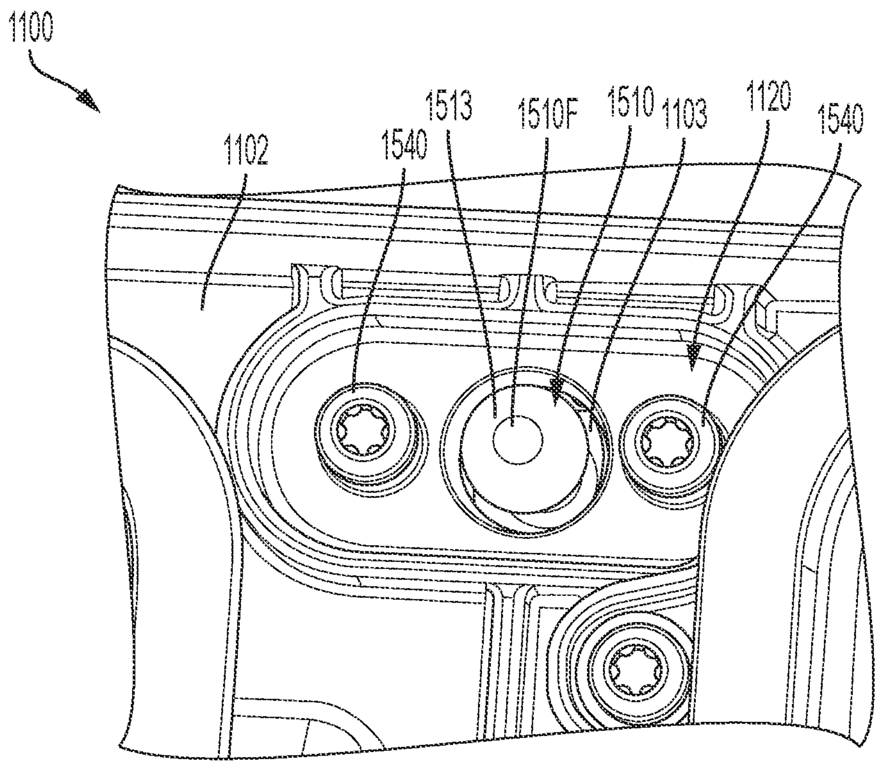
FIG. 11 is a front view of part of the carrier frame and part of the attachment assembly of the headlamp aiming system of FIG. 1.
Figure 12:
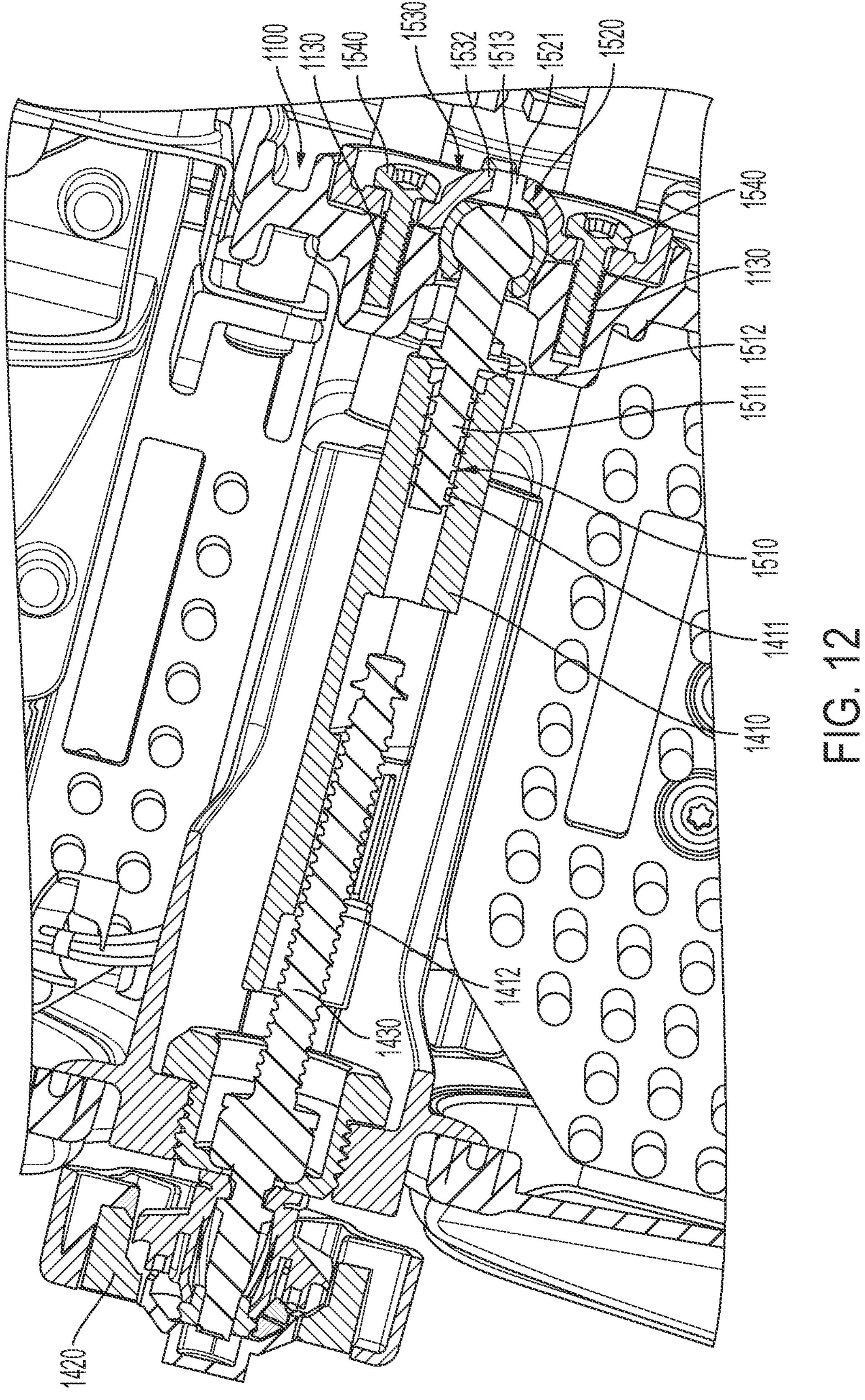
FIG. 12 is a cross-sectional view of the headlamp aiming system of FIG. 1 along the line 12-12 in FIG. 8.
Figure 13:
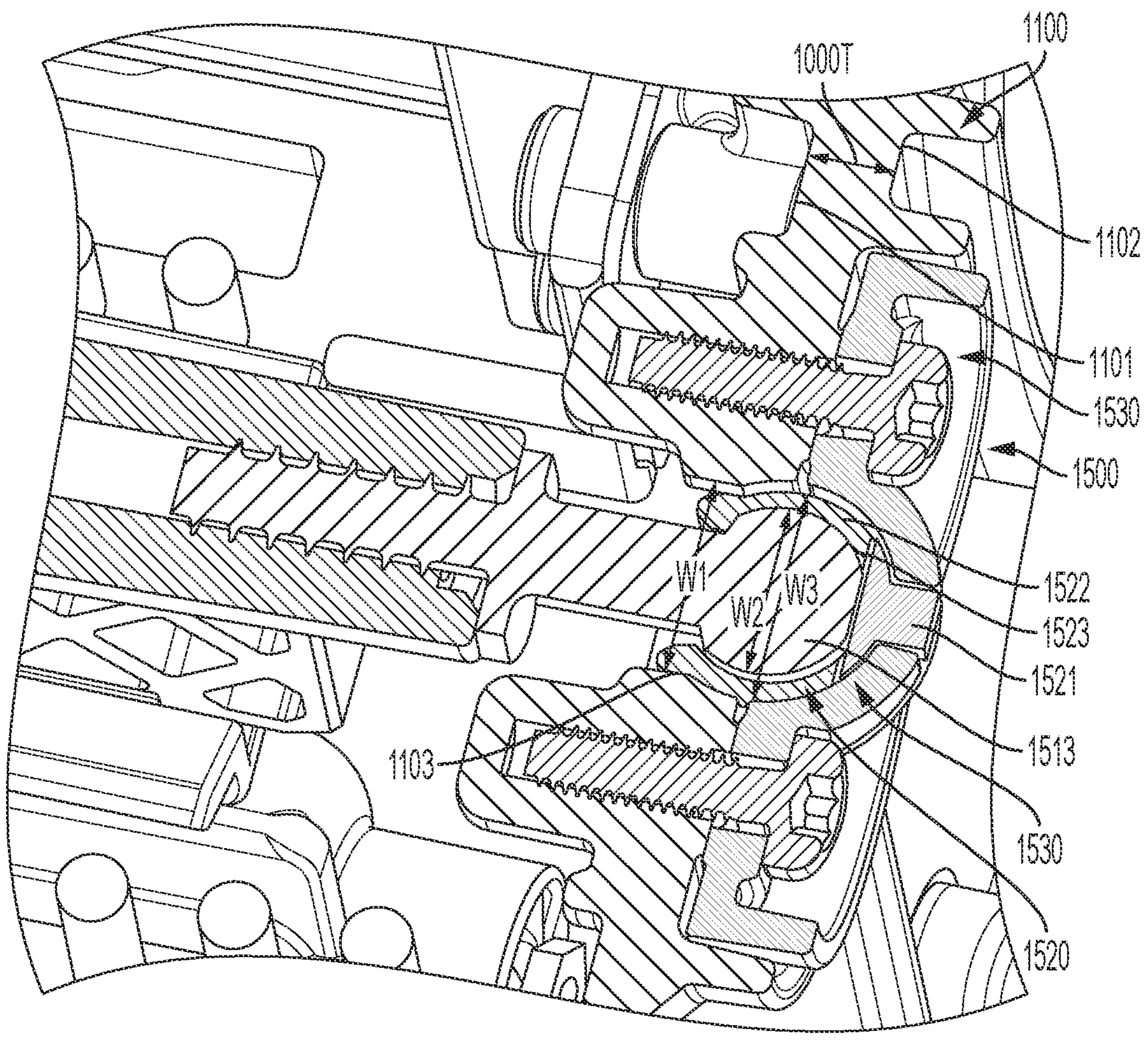
FIG. 13 is another cross-sectional view of a portion of the headlamp aiming system of FIG. 1 along the line 12-12 in FIG. 8.

FIG. 1 is a front perspective view of a headlamp aiming system 1000 according to some examples. FIG. 2 is a rear perspective view of the headlamp aiming system 1000 of FIG. 1 without left and right back panels of a headlamp casing 1910 of the headlamp aiming system 1000. FIG. 3 is a rear perspective view of the headlamp aiming system 1000 of FIG. 1 without the headlamp casing 1910. FIG. 4 is a perspective view of a first ball joint socket 1111 of the headlamp aiming system 1000 of FIG. 1. FIG. 5 is another perspective view of the first ball joint socket 1111 of the headlamp aiming system 1000 of FIG. 1 with a first ball joint 1940 installed in the first ball joint socket 1111. FIG. 6 is a cross-sectional view of the first ball joint socket 1111 and the first ball joint 1940 of FIG. 5 along the line 6-6 in FIG. 5. FIG. 7 is a front view of part of the headlamp aiming system 1000 of FIG. 1 without a cover lens 1920 and a carrier frame 1100 of the headlamp aiming system 1000. FIG. 8 is a front perspective view of the headlamp aiming system 1000 of FIG. 1 without the cover lens 1920 and headlamp casing 1910 of the headlamp aiming system 1000. FIG. 9 is a partially exploded perspective front view of an attachment assembly 1500, the carrier frame 1100, and a bridge 1400 of the headlamp aiming system 1000 of FIG. 1. FIG. 10 is a partially exploded perspective rear view of the of the attachment assembly 1500, the carrier frame 1100, and the bridge 1400 of the headlamp aiming system 1000 of FIG. 1. FIG. 11 is a front view of part of the carrier frame 1100 and part of the attachment assembly 1500 of the headlamp aiming system 1000 of FIG. 1. FIG. 12 is a cross-sectional view of the headlamp aiming system 1000 of FIG. 1 along the line 12-12 in FIG. 8. FIG. 13 is another cross-sectional view of a portion of the headlamp aiming system 1000 of FIG. 1 along the line 12-12 in FIG. 8.

Referring concurrently to FIGS. 1-13, the headlamp aiming system 1000 may be configured to provide light for a headlamp of a vehicle, such as a truck, a passenger vehicle, etc. For example, the headlamp aiming system 1000 may be configured to provide light for one of a right headlamp and a left headlamp of the vehicle, and the vehicle may include two of the headlamp aiming systems 1000 (one for the right headlamp and another for the left headlamp).

The headlamp aiming system 1000 may include at least one projector unit configured to generate light, and the headlamp aiming system 1000 may be configured to control the direction along which the generated light is projected from the headlamp aiming system. For example, the headlamp aiming system 1000 may be configured to vertically aim the generated light along a direction measured in along a vector perpendicular to a ground plane. In the non-limiting and non-exhaustive example depicted, the headlamp aiming system 1000 includes a first projector unit 1200 and a second projector unit 1300. In some examples, one of the first and second projector units 1200 and 1300 is a high beam projector unit for providing light for a vehicle's high beam, and the other one of the first and second projector units 1200 and 1300 is a low beam projector unit for providing light for the vehicle's low beam. In the depicted example, the first and second projector units 1200 and 1300 are light emitting diode (LED) projector units, each including an LED light source. In some other examples, one or both of the first and second projector units 1200 and 1300 is a projector unit other than an LED projector unit and has a light source other than an LED light source.

The first projector unit 1200 includes a first heat sink 1210 and a first projector lens 1220, and the second projector unit 1300 includes a second heat sink 1310 and a second projector lens 1320. Light generated by the first and second projector units 1200 and 1300 may be respectively guided through the first and second lenses 1220 and 1320. Heat generated by the first and second projector units 1200 and 1300 may be respectively dissipated through the first and second heat sinks 1210 and 1310. The amount of heat generated by the first and second projector units 1200 and 1300 may depend in part on their respective light sources. LED light sources can generate significantly more heat than other types of light sources and, thus, require significantly larger (and heavier) heat sinks in order to adequately dissipate the generated heat. As discussed in more detail below, this can result in higher forces between components within the headlamp aiming system 1000 and an increased risk of disengagement between such components.

The first and second projector units 1200 and 1300 may be housed within a headlamp housing 1900, which may be configured to attach to, for example, the vehicle's frame, the interior of a vehicle's fairing, or to another part of the vehicle. The headlamp housing 1900 may include a headlamp casing 1910 (e.g., a generally optically opaque case), configured to house at least some components of the headlamp aiming system 1000, and an optically transparent or semitransparent cover lens 1920 configured to attach to a front of the headlamp casing 1910. The cover lens 1920 may be allow light generated by the first and second projector units 1200 and 1300 to be transmitted out from the headlamp housing 1900.

The headlamp aiming system 1000 may include a carrier frame 1100, a bridge 1400, and an attachment assembly 1500, each of which may be at least partially housed within the headlamp housing 1900. The headlamp aiming system 1000 may include other components, such as wires (e.g., wires for transmitting power or control signals), processors, fastening components, etc.

The carrier frame 1100 may be configured to attach to the first and second projector units 1200 and 1300, and to be rotatably coupled to the headlamp housing 1900 about a rotational axis 1150. The bridge 1400 may be configured to be attached to the carrier frame 1100 by the attachment assembly 1500. The attachment assembly 1500 will be discussed in more detail below. The bridge 1400 may be controllably and linearly moveable relative to the headlamp housing 1900 along a translational axis 1450 such that linear movement of the bridge 1400 relative to the headlamp housing 1900 causes the carrier frame 1100 to rotate about the rotational axis 1150. For example, the rotational axis 1150 may be positioned at (e.g., proximal to or near to) one of a top side 1106 or a bottom side 1107 of the carrier frame 1100, and the bridge 1400 may be attached to the carrier frame 1100 at the other one of the top side 1106 or bottom side 1107 such that moving the bridge 1400 along the translational axis 1450 can rotate the carrier frame 1100 relative to the headlamp housing 1900. This can allow light projected from the first and second projector units 1200 and 1300 to be controllably aimed upwards or downwards.

The carrier frame 1100 may have a first side 1101 (e.g., an aft side) and a second side 1102 (e.g., a fore side) opposite to the first side 1101. The top and bottom sides 1106 and 1107 may extend between (e.g., may connect) the first and second sides 1101 and 1102. The carrier frame 1100 may have first and second openings 1104 and 1105 respectively configured to allow light generated by the first and second light units 1200 and 1300 to be transmitted through the carrier frame 1100.

As shown, e.g., in FIG. 3, a plurality of ball socket joints may be attached to the first side 1101 of the carrier frame 1100 and aligned along the rotational axis 1150. In the depicted example, the carrier frame 1100 includes first, second, and third ball socket joints 1111, 1112, and 1113. In some other examples, the carrier frame 1100 may include two or four or more ball socket joints. The carrier frame 1100 may have respective recesses or indents in the first side 1101 that are respectively shaped and sized to receive at least part of the first, second, and third ball socket joints 1111, 1112, and 1113. In some examples, the first, second, and third ball socket joints 1111, 1112, and 1113 are attached to the carrier frame 1100 by fasteners 1115. In some other examples, the first, second, and third ball socket joints 1111, 1112, and 1113 are attached to the carrier frame 1100 by other mechanisms.

A plurality of ball joints may be attached to the headlamp casing 1910 and configured to respectively pivotably engage with the plurality of ball joint sockets that are attached to the carrier frame 1100. In the depicted example, first, second, and third ball joints 1940, 1950, and 1960 are attached to the headlamp casing 1910 and are respectively configured to pivotably engage with the first, second, and third ball joint sockets 1111, 1112, and 1113. The first ball joint 1940 may have a threaded shaft 1941 and a ball 1942. The threaded shaft 1941 is configured to engage with a threaded hole in the headlamp casing 1910 to attach the first ball joint 1940 to the headlamp casing 1910, and the ball 1942 may be configured to engage with the first ball joint socket 1111 to pivotably couple the first ball joint 1940 to the carrier frame 1100. The second and third ball joints 1950 and 1960 may have a similar structure and configuration. For example, the second and third ball joints 1950 and 1960 may each have a threaded shaft, the second ball joint 1950 may have a ball 1952, and the third ball joint 1960 may have a ball 1962.

The first ball joint socket 1111 may be configured for the first ball joint 1940 to be force fitted or friction fitted into the first ball joint socket 1111. For example, the first ball joint 1940 may be installed into the first ball joint socket 1111 by pushing the ball 1942 into the first ball joint socket 1111 with a force (or pressure) exceeding a threshold force (or threshold pressure). In some examples, the ball joint socket 1111 is a snap-fit socket. The first ball joint 1940 and the first ball joint socket 1111 may be configured to allow the first ball 1942 to rotate within the first ball joint socket 1111 once installed. When the first, second, and third ball joints 1940, 1950, and 1960 are respectively installed into the first, second, and third ball socket joints 1111, 1112, and 1113, the carrier frame 1100 may be rotatable about the rotational axis 1150.

The headlamp casing 1910 may have at least one groove shaped and sized to receive at least part of the bridge 1400 and may be configured to allow the bridge 1400 to be linearly movable relative to the headlamp casing 1910 along the translational axis 1450. In the depicted example, the headlamp casing 1910 has a top groove 1931 and a bottom groove 1932, and a main body 1410 of the bridge 1400 is shaped and sized to fit within the top and bottom grooves 1931 and 1932 and to slide along the top and bottom grooves 1931 and 1932.

The bridge 1400 may include the main body 1410, a knob 1420, and a screw 1430 coupled between the main body 1410 and the knob 1420 such that turning the knob 1420 about the translational axis 1450 causes, via the screw 1430, the main body 1410 to move along the translational axis 1450. For example, the fastener 1430 may be jack screw. In some other examples, the main body 1410 may be linearly movable along the translational axis 1450 by other mechanisms, such as via a bevel gear. As shown in FIG. 2, the knob 1420 may be exposed to outside the headlamp casing 1910 so that movement of the bridge 1400 can be controlled from outside the headlamp casing 1910.

The main body 1410 of the bridge 1400 may be attached to the carrier frame 1100 by the attachment assembly 1500. Because the bridge 1400 is attached to the carrier frame 1100, movement of the bridge 1400 along the translational axis 1450 can apply a torque to the carrier frame 1100 relative to the headlamp housing 1900 to cause the carrier frame 1100 to rotate about the rotational axis 1150.

Referring to FIGS. 8-13, the attachment assembly 1500 may include a ball joint 1510, a receptacle shell 1520, a cap 1530, and one or more screws 1540. The ball joint 1510 may include a threaded shaft 1511 at an aft end 1510A of the ball joint 1510, a ball 1513 at an opposite fore end 1510F of the ball joint 1510, and a flange 1512 between the threaded shaft 1511 and the ball 1513. The threaded shaft 1511 may be configured to engage with a threaded opening in the main body 1410 of the bridge 1400 to attach the ball joint 1510 to the bridge 1400. In some other examples, the ball joint 1510 may be configured to attach to the bridge 1400 by other mechanisms, such as by an adhesive, welding, etc. In some examples, the ball joint 1510 may be integrally formed with the bridge 1400. The ball 1513 may be shaped and sized to be movable through the ball joint opening 1103, and the flange 1512 may be shaped and sized to be blocked from moving through the ball joint opening 1103. For example, the flange 1512 may be larger than at least part of the ball joint opening 1103 such that it is unable to move through the ball joint opening 1103.

The cap 1530 may be configured to be attached to the second side 1102 of the carrier frame 1100 and to cover at least part of the ball joint opening 1103 and the ball 1513 of the ball joint 1510. In some examples, the cap 1530 does not directly contact the ball 1513. The cap 1530 may be attached to the carrier frame 1100 by one or more screws 1540, which may extend into the second side 1102 of the carrier frame 1100 and at least partly (e.g., partly or entirely) through the carrier frame 1100 between the first and second sides 1101 and 1102. In the non-limiting and non-exhaustive example depicted, the cap 1530 is attached to the carrier frame 1100 by two screws 1540, the cap 1530 has two screw holes 1531 shaped and sized to receive at least part of the two screws 1540, and the carrier frame 1100 has two threaded screw holes 1130 shaped and sized to receive at least part of the two screws 1540. In some other examples, the cap 1530 may be attached to the second side 1102 of the carrier frame 1100 by other mechanisms, such as an adhesive, etc.

In some examples, the second side 1102 of the carrier frame 1100 has an indent 1120 shaped and sized to receive at least part of the cap 1530. For example, a shape (e.g., a cross-sectional shape) of the indent 1120 may generally correspond to a shape (e.g., a cross-sectional shape) of the cap 1530. The cap 1530 may contact a sidewall defining at least part of the indent 1120 when the cap 1530 is attached to the carrier frame 1100. The indent 1120 may provide additional support and securement of the cap 1530.

The receptacle shell 1520 may include a main body 1522 having a cavity 1523 that is shaped and sized to receive at least part of the ball 1513 of the ball joint 1510. The main body 1522 may be a socket configured for the ball 1513 to be installed into the cavity 1523 by a force fit or a friction fit. For example, the main body 1522 may be or include a snap-fit type socket with multiple (e.g., four) flexible or semi-flexible prongs to permit the ball 1513 to be snapped into (or removed from) the cavity 1523 prior to the cap 1530 being attached to the carrier frame 1100. In some examples, the main body 1522 may include a nylon material or a low-friction material configured to enable the ball 1513 to pivot within the cavity 1523 after the ball 1513 has been installed within the main body 1522. The main body 1522 may be configured to cover at least part of the ball 1513 and to directly contact the ball 1513.

The receptacle shell 1520 may be configured to be attached to the cap 1530 such that the main body 1522 is between (e.g., directly between) the ball 1513 and the cap 1530 when the ball 1513 is installed into the cavity 1523 and the receptacle shell 1520 is attached to the cap 1530. The main body 1522 may also be between the ball 1513 and the carrier frame 1100 (e.g., sidewalls of the ball joint opening 1103) when the cap 1530 is attached to the second side 1102 of the carrier frame 1100. In some examples, the receptacle shell 1520 includes a post 1521 extending from the main body 1522 and configured (e.g., shaped and sized) to engage with a post opening 1532 in the cap 1530 to attach the receptacle shell 1520 to the cap 1530 and to secure a position of the receptacle shell 1520 relative to the cap 1530. In some other examples, the receptacle shell 1520 and the cap 1530 are configured for the receptacle shell 1520 to be attached to the cap 1530 by other mechanisms, such as an adhesive, one or more fasteners, etc. The receptacle shell 1520 may be a distinct component (e.g., manufactured separately) from the cap 1530 and that is attached to the cap 1530, for example, during an assembling process. In some other examples, the receptacle shell 1520 forms an integral part of the cap 1530.

The ball 1513 of the ball joint 1510 may be shaped and sized to be movable through the ball joint opening 1103. The main body 1522 may be shaped and sized such that, when the main body 1522 is installed onto the ball 1513, the combination of the main body 1522 and the ball is blocked from moving through the ball joint opening 1103 (e.g., is larger than a narrowest portion of the ball joint opening 1103).

For example, referring to FIG. 13, the ball joint opening 1103 may have a first width W1, the ball 1513 may have a second width W2, and the main body 1522 may have a third width W3 when installed onto the ball 1513. The second width W2 of the ball 1513 may be less than or equal to the first width W1, and the third width W3 may be greater than the first width W1. In some examples, the third width W3 is greater than the first width W1 by 2%, 5%, 10%, 15%, 20%, or 25% of the first width W1. Thus, while the ball 1513 may be fitted through the ball joint opening 1103 during an assembling process (because the second width W2 is less than the first width W1), the combination of the ball 1513 and the main body 1522 may be unable to be moved back through the ball joint opening 1103 (because the third width W3 is greater than the first width W1) without butting up against (and being blocked by) the sidewalls of the ball joint opening 1103. In addition, because, after assembly, the cap 1530 may be attached to the carrier frame 1130, the prongs of the main body 1522 can be prevented from flexing outward enough for the ball 1513 to escape the cavity 1523 of the main body 1522.

Each of the first width W1, the second width W2, and the third width W3 may be defined along a direction perpendicular to a thickness direction of the carrier frame 1100. The thickness direction of the carrier frame 1100 may be defined as being parallel to a shortest line between the first and second sides 1101 and 1102 at a portion of the carrier frame 1100 proximal to (e.g., adjacent to) the ball joint opening 1103. In some examples, the thickness direction of the carrier frame 1100 is defined to be normal to (e.g., perpendicular to) a flat portion of the first side 1101 and/or a flat portion of the second side 1102 proximal to the ball joint opening 1103. A thickness 1000T of the carrier frame 1100 along a thickness direction according to some examples is illustrated in FIG. 13.

Any two selected from among the first width W1, the second width W2, and the third width W3 may be measured along respective directions parallel to or non-parallel to each other. In some examples, the first width W1 is a smallest width of the ball joint opening 1103 (corresponding to a narrowest portion of the ball joint opening 1103). The second width W2 may be a greatest width of the ball 1513, and the third width W3 may be a greatest width of the combination of the ball 1513 and the main body 1522.

When the bridge 1400 is attached to the carrier frame 1100 by the attachment assembly 1500, the flange 1512 and the threaded shaft 1511 of the ball joint 1510 may be on the first side 1101 of the carrier frame 1100, the ball 1513 may extend through at least part of the ball joint opening 1103 to be at least partially on the second side 1102 of the carrier frame 1100, the ball 1513 may be installed into the main body 1522 of the receptacle shell 1520, the receptacle shell 1520 may be attached to the cap 1530, and the cap 1530 may be attached to the second side 1102 of the carrier frame 1100. When the bridge 1400 is attached to the carrier frame 1100 by the attachment assembly 1500, the main body 1522 of the receptacle shell 1520 may both be between the ball 1513 and the cap 1530 and between the ball 1513 and the carrier frame 1100 (e.g., the sidewalls of the ball joint opening 1103)

During an assembling process of the attachment assembly 1500, the ball joint 1510 may be positioned entirely on the first side 1101 of the carrier frame 1100 and attached to the bridge 1400. The ball 1513 may then be guided at least partially through the ball joint opening 1103, then the receptacle shell 1520 may be installed onto the ball 1513, and then the cap 1530 may be attached to the second side 1102 of the carrier frame 1100. The receptacle shell 1520 may be attached to the cap 1530 before or after the receptacle shell 1520 is installed onto the ball 1513.

The ball joint 1510 can be dislodged from the receptacle shell 1520 by applying a separation force between the ball joint 1510 and the receptacle shell 1520 (e.g., pulling the ball joint 1510 outwardly from the receptacle shell 1520) that exceeds a threshold force. Because the second and third widths W2 and W3 are respectively smaller than and greater than the first width W1, the threshold force may be a first threshold force when the attachment assembly 1500 is a first state, whereby the ball joint 1510 is installed in the receptacle shell 1520 and the ball joint 1510 is not extending through the ball joint opening 1103 (e.g., the carrier frame 1100 is not present), and may be a second threshold force greater than the first threshold force when the attachment assembly 1500 is in a second state, whereby the attachment assembly 1500 is fully assembled and attached to the carrier frame 1100 with the ball joint 1510 extending at least partly through the ball joint opening 1103. The receptacle shell 1520 may be attached or unattached to the cap 1530 when the attachment assembly 1500 is in the first state.

When the attachment assembly 1500 is in the first state, pulling the ball joint 1510 away from the main body 1522 with the first threshold force can cause the main body 1522 to expand and release the ball joint 1510. However, when the attachment assembly 1500 is in the second state, the receptacle shell 1520 may be between the ball 1513 and the sidewalls of the ball joint opening 1103 such that pulling on the ball joint 1510 away from the main body 1522 (e.g., toward the first side 1101 of the carrier frame 1100) will cause the main body 1522 to be compressed between the ball 1513 and the sidewalls of the ball joint opening 1103. Thus, the main body 1522 may be unable to expand (due to a lack of room to accommodate such expansion) to release the ball joint 1510 when the ball joint 1510 is pulled away from the main body 1522 with the first threshold force. The second threshold force may be a force sufficient to cause the main body 1522 to be sufficiently compressed and/or to cause the ball joint opening 1103 to sufficiently expand so that the ball 1513 is pulled out from the main body 1522. In some examples, the second threshold force may be a force sufficient to cause part of the main body 1522 to break so that the ball 1513 disengages from at least part of the receptacle shell 1520.

Depending on the configuration of the attachment assembly 1500, the second threshold force may be significantly larger than the first threshold force. For example, the second threshold force may be at least 2, 3, 5, 10, 20, 50, or 100 times greater than the first threshold force. In some examples, the first threshold force is less than 300 Newtons, 200 Newtons, or 100 Newtons. The second threshold force may be greater than 400 Newtons, 600 Newtons, 800 Newtons, 1,000 Newtons, 2,000 Newtons, or 10,000 Newtons.

Accordingly, the ball joint 1510 can be more securely installed in the receptacle shell 1520, and the risk of dislodgement of the ball joint 1510 from the receptacle shell 1520 can be reduced. In contrast, in a comparative example where the ball joint 1510 is only engaged with a ball joint socket (e.g., a ball joint socket such as socket 1111) that is attached to the first side 1101 of the carrier frame 1100, the ball joint 1510 can be dislodged from the ball joint socket in response to the first threshold force being applied to the ball joint 1510.

As explained above, certain projector unit types, such as LED projector units, can be significantly heavier than other projector units. Such projector units may be attached to the carrier frame 1100 in a cantilevered manner and can therefore result in significantly higher forces between components coupling the carrier frame 1100 to the headlamp casing 1910 (e.g., between the ball joint 1510 and the receptacle shell 1520). Such forces can occur when a vehicle including the headlamp aiming assembly 1000 moves around abruptly, such as then the vehicle goes over a bumpy dirt road or a pothole. When such forces exceed the first threshold force, the components can become disconnected from each other, which can affect the vertical alignment of the vehicle's headlamp, thereby requiring vehicle maintenance and imposing safety risks on the driver.

However, when the ball joint 1510 is attached to the carrier frame 1100 by the attachment assembly 1500 as described herein, the ball joint 1510 can be more securely engaged with the receptacle shell 1520, and the risk of dislodgement can be reduced or eliminated.

In the depicted example, the bridge 1400, which is movable along the translational axis 1450, is attached near the top side 1106 of the carrier frame 1100 so that the carrier frame 1100 can be controllably steered about the rotational axis 1150 positioned near the bottom side 1107 of the carrier frame 1100. In some other examples, the bridge 1400 is attached via the attachment assembly 1500 near the bottom side 1107 of the carrier frame 1100, and the plurality of ball socket joints (e.g., the first, second, and third ball socket joints 1111, 1112, and 1113) are positioned near the top side 1106 of the carrier frame 1100 so that the carrier frame 1100 can be controllably steered about the rotational axis 1150 positioned at the top side 1106 of the carrier frame 1100.

Although specific examples are described herein, the scope of the technology is not limited to those specific examples. Moreover, while different examples and examples may be described separately, such examples and examples may be combined with one another in implementing the technology described herein. One skilled in the art will recognize other examples or improvements that are within the scope and spirit of the present technology. Therefore, the specific structure, acts, or media are disclosed only as illustrative examples. The scope of the technology is defined by the following claims and any equivalents therein.

What is claimed is:

1. A headlamp aiming system, comprising:

a carrier frame having opposite fore and aft sides, having a ball joint opening extending from the aft side through the entire carrier frame to the fore side, and being configured to attach, at the aft side, to at least one headlamp projector unit;

a ball joint comprising a ball at a fore end of the ball joint, the ball joint extending through the ball joint opening such that the ball is at least partially on the fore side of the carrier frame;

a cap attached to the fore side of the carrier frame and covering the ball joint opening; and a receptacle shell directly covering the ball, the receptable shell being between the ball and the cap and between the ball and the carrier frame.

2. The headlamp aiming system of claim 1, wherein a thickness of the carrier frame between the fore and aft sides of the carrier frame proximate the ball joint opening is defined along a thickness direction, and wherein a greatest width of the ball along a width direction perpendicular to the thickness direction is less than a smallest width of the ball joint opening along the width direction, and a greatest width of the combination of the ball and the receptacle shell along the width direction is greater than the smallest width of the ball joint opening along the width direction.

3. The headlamp aiming system of claim 1, wherein the cap is attached to the carrier frame by one or more screws extending into the fore side of the carrier frame.

4. The headlamp aiming system of claim 1, wherein the receptacle shell and the cap are distinct components, and the receptacle shell has a main body and post protruding from the main body, the post being engaged with an opening in the cap to secure a position of the receptacle shell relative to the cap.

5. The headlamp aiming system of claim 1, comprising a bridge controllably movable along a fore-aft direction, the ball joint being attached to the bridge.

6. The headlamp aiming system of claim 5, comprising:

a headlamp casing, the carrier frame being inside the headlamp casing;

a plurality of ball joint sockets attached to the aft side of the carrier frame, the plurality of ball joint sockets being aligned along a rotational axis positioned at one of a top or a bottom of the carrier frame; and a plurality of ball joints attached to the headlamp casing, each of the plurality of ball joints having a ball pivotably engaged with a corresponding one of the ball joint sockets such that the carrier frame can rotate about the rotational axis, wherein the ball joint opening is positioned at the other one of the top or the bottom of the carrier frame.

7. The headlamp aiming system of claim 1, wherein the carrier frame is configured to attach to a first projector unit comprising a first light source for a high beam of a vehicle and to a second projector unit comprising a second light source for a low beam of the vehicle.

8. The headlamp aiming system of claim 1, comprising the headlamp projector unit, the headlamp projector unit being a light emitting diode (LED) projector unit comprising an LED light source.

9. A headlamp aiming system, comprising:

a carrier frame having opposite first and second sides, having a ball joint opening extending from the first side through the entire carrier frame to the second side, and being configured to attach, at the first side, to at least one headlamp projector unit;

a bridge on the first side of the carrier frame, and controllably movable along a translational axis;

a ball joint attached to the bridge, having a ball at a terminal end of the ball joint, and extending through the ball joint opening such that the ball is at least partially on the second side of the carrier frame; and a receptacle shell covering the ball, wherein a thickness of the carrier frame between the first and second sides of the carrier frame proximate the ball joint opening is defined along a thickness direction, wherein a greatest width of the ball along a width direction perpendicular to the thickness direction is less than a smallest width of the ball joint opening along the width direction, and a greatest width of the combination of the ball and the receptacle shell along the width direction is greater than the smallest width of the ball joint opening along the width direction, wherein the headlamp aiming system comprises a cap attached to the second side of the carrier frame and at least partially covering the receptacle shell, and wherein the receptacle shell and the cap are distinct components, and the receptacle shell is attached to the cap.

10. The headlamp aiming system of claim 9, wherein the receptacle shell is fixedly coupled to the second side of the carrier frame.

11. The headlamp aiming system of claim 9, wherein the receptacle shell is at least partially between the ball and sidewalls of the ball joint opening.

12. A headlamp aiming system, comprising:

a carrier frame having opposite first and second sides, having a ball joint opening extending from the first side through the entire carrier frame to the second side, and being configured to attach, at the first side, to at least one headlamp projector unit;

a bridge on the first side of the carrier frame, and controllably movable along a translational axis;

a ball joint attached to the bridge, having a ball at a terminal end of the ball joint, and extending through the ball joint opening such that the ball is at least partially on the second side of the carrier frame; and a receptacle shell covering the ball, wherein a thickness of the carrier frame between the first and second sides of the carrier frame proximate the ball joint opening is defined along a thickness direction, wherein a greatest width of the ball along a width direction perpendicular to the thickness direction is less than a smallest width of the ball joint opening along the width direction, and a greatest width of the combination of the ball and the receptacle shell along the width direction is greater than the smallest width of the ball joint opening along the width direction, wherein the headlamp aiming system comprises a cap attached to the second side of the carrier frame and at least partially covering the receptacle shell, and wherein the cap is attached to the carrier frame by one or more fasteners extending into the second side of the carrier frame.

13. The headlamp aiming system of claim 9, wherein the carrier frame is configured to rotate about a rotational axis in response the bridge being moved along the translational axis.

* * * * *